United States Patent [19]

Ishibashi et al.

[11] 4,440,511

[45] Apr. 3, 1984

[54] MULTISHAFT SUPPORTING DEVICES

[75] Inventors: Junya Ishibashi, Numazu; Shigeru Miyazaki, Mishima; Shoichi Tanaka, Shizuoka, all of Japan

[73] Assignee: Toshiba Kikai Kabushiki Kaisha, Tokyo, Japan

[21] Appl. No.: 417,862

[22] Filed: Sep. 14, 1982

[30] Foreign Application Priority Data

Sep. 17, 1981 [JP] Japan .................................. 56-146749

[51] Int. Cl.³ ............................................. F16C 17/22
[52] U.S. Cl. ......................................................... 384/278
[58] Field of Search ............... 384/278, 441, 295, 900; 308/DIG. 14

[56] References Cited

U.S. PATENT DOCUMENTS

| | | | |
|---|---|---|---|
| 2,386,951 | 10/1945 | Howe | 384/278 |
| 2,970,019 | 1/1961 | Brown et al. | 384/278 |
| 3,359,047 | 12/1967 | Andersen | 308/DIG. 14 |
| 3,449,032 | 6/1969 | Scheufler | 384/278 |

*Primary Examiner*—Lenard A. Footland
*Attorney, Agent, or Firm*—Koda and Androlia

[57] ABSTRACT

In a multishaft supporting device comprising a barrel and sleeve adapted to receive a plurality of shafts of a kneader, a twin shaft extruder or the like, inserts made of a metal having larger thermal expansion coefficient than the barrel and sleeve are inserted between the barrel and the sleeve to improve heat transfer therebetween.

5 Claims, 6 Drawing Figures

MULTISHAFT SUPPORTING DEVICES

BACKGROUND OF THE INVENTION

This invention relates to a multishaft supporting device for use in a kneading machine, a twin shaft extruder or the like.

A plurality of screw shafts of these machines have been supported by a barrel having a sleeve formed with a plurality of openings for supporting the screw shafts. The sleeve has generally a figure 8 shaped opening for supporting two screw shafts and made of wear resistant and corrosion resistant material. According to prior art constructions, the barrel and the sleeve are divided into upper and lower sections along a horizontal plane and the upper and lower sections are bolted together or the sleeve is bolted to the inner surface of the barrel. According to these constructions, however, in order to improve the heat transfer between the inner surface of the bore of the barrel and the peripheral surface of the sleeve it is necessary to finish these surfaces at high accuracies to minimize, as far as possible, the gap therebetween. This not only requires a high degree of machining but also is impossible to decrease heat loss. According to another prior art construction, molten metal having low melting point is poured into the gap between a barrel and a sleeve contained therein to integrally combine the barrel and the sleeve. With this construction, however, when the temperature of the barrel increases beyond the melting point of the metal during the use of the barrel, the metal would melt to release the sleeve from the barrel. This construction also requires to carefully machine such that the gap between the inner bore of the barrel and the outer periphery of the sleeve would be uniform. Moreover, when pouring the molten metal into the gap, it is necessary to hold the barrel and the sleeve to maintain uniform gap.

As a wear resistant material, metal carbides, for example, sintered tungsten carbide have been used, but such metal carbides have low thermal expansion coefficients and small elongations at the time of fracture so that when they are used to form a sleeve, a gap or stress would be formed due to the difference between the thermal expansion coefficients of the barrel and the sleeve.

SUMMARY OF THE INVENTION

Accordingly, it is an object of this invention to provide an improved multishaft supporting device comprising a barrel and a sleeve adapted to support a plurality of shafts and can obviate various difficulties of the prior art described above.

According to this invention, there is provided a multishaft supporting device comprising a barrel provided with a bore, a sleeve inserted into the bore and provided with an opening for receiving a plurality of shafts, and inserts interposed between the barrel and the sleeve, the inserts being made of material having larger expansion coefficient than the barrel and the sleeve.

Examples of such material are copper, aluminum, brass and stainless steel.

DESCRIPTION OF THE PREFERRED EMBODIMENTS

In a preferred embodiment of this invention shown in FIGS. 1 through 5, a barrel 11 made of metal is provided with an inner bore 14 adapted to receive a sleeve 12 and passages 17 for passing cooling water.

Figure 1:
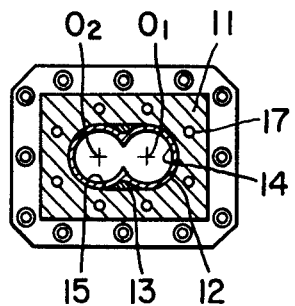
FIG. 1 is a sectional view of one embodiment of the multishaft supporting device according to this invention, taken along a line I—I in FIG. 2.
Figure 4:
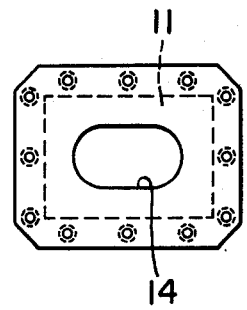
FIG. 4 is a front view of a barrel.
Figure 2:
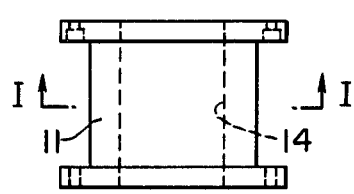
FIG. 2 is a plan view of the multishaft supporting device embodying the invention.

As shown in FIG. 4, the bore 14 has a cross-sectional configuration of an elongated slot with semicircular ends, and extends in the axial direction as shown in FIG. 2. The sleeve 12 has a cross-sectional configuration of substantially a figure 8 shape defining two parallel openings having axes $O_1$ and $O_2$. The outer contour of the sleeve is selected such that it can closely fit in the bore 14 under normal or elevated temperature. At the central portions of the upper and lower sides of the sleeve are formed recesses 16a and 16b extending in parallel with the axes $O_1$ and $O_2$. The gaps formed between the grooves 16a and 16b and the inner surface of the bore 14 when the sleeve is inserted thereinto are filled with inserts 13. The inserts 13 are made of a material having larger thermal expansion coefficient and heat conductivity than those of the barrel and sleeve. For example, when the barrel 11 is made of structural carbon steel having a thermal expansion coefficient of $1 \times 10^{-5}/°C$. and when the sleeve 12 is made of an ultra hard sintered alloy having a thermal expansion coefficient of $0.6 \times 10^{-5}/°C$. it is advantageous to make the inserts 13 of copper having a thermal expansion coefficient of $1.65 \times 10^{-5}/°C$., aluminum having a thermal expansion coefficient of $2.21 \times 10^{-5}/°C$., brass having a thermal expansion coefficient of $1.89 \times 10^{-5}/°C$., or stainless steel having a thermal expansion coefficient of $1.73 \times 10^{-5}/°C$. In order to securely bond together the barrel 11 and the sleeve 12 even at normal temperature it is advantageous to assemble them after heating the barrel 11 or cooling the sleeve 12 and the inserts 13.

The inserts 13 are inserted simultaneously with the sleeve 12 or after insertion thereof into the bore. When the temperature of the barrel, sleeve and inserts returns to normal temperature or when the temperature of the assembly rises during actual use, the inserts 13 expand to intimately interconnect the barrel 11 and the sleeve 12. As the temperature during the normal use increases the thermal expansion also increases so that the sleeve 12 and inserts 13 may be incorporated into the bore 14 at normal temperature.

As above described, while the sleeve 12 and the inserts 13 may be inserted into the bore of the barrel with a small clearance, when the temperature differential between the barrel 11 and the sleeve 12 decreases or when the temperature of the assembly increases, the inserts 13 expand much more than the barrel and the sleeve due to their large thermal expansion coefficient, thus ensuring firm contact between the barrel and the sleeve.

Heat transfer between the barrel 11 and sleeve 12 can be enhanced because of the high heat conductivity of the inserts and because the inserts ensure firm contact between the barrel and the sleeve.

The heat generated by friction between the sleeve 12 and two shafts supported thereby is transmitted to the barrel 11 via inserts 13 and removed by the cooling water flowing through passages 17. Where the assembly is heated by a heater, not shown, provided about the barrel, the inserts efficiently transfers heat to the sleeve 12 from the barrel 11.

Figure 5:
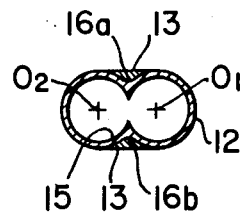
FIG. 5 is a cross-sectional view of the sleeve applied with metal inserts having a large thermal expansion coefficient.
Figure 3:
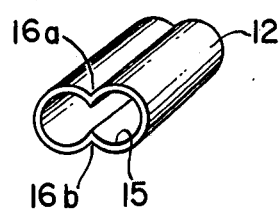
FIG. 3 is a perspective view of a sleeve.
Figure 6:
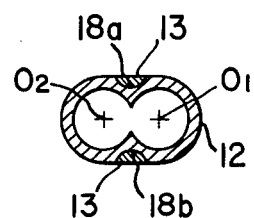
FIG. 6 is a cross-sectional view showing a modified sleeve.

A modified sleeve 12 shown in FIG. 6 has generally the same cross-sectional configuration as that of the sleeve 12 shown in FIG. 5. In this case, however, the sleeve is made slightly larger or smaller than the bore 14 of the barrel 14 so as to readily insert the sleeve into the barrel by cooling or heating as above described.

Instead of inserting the inserts 13 into gaps formed between the barrel and the sleeve after inserting the sleeve into the barrel, the inserts may be secured to the recesses 16a, 16b or 18a, 18b by screws, brazing or bonding agent before inserting the sleeve into the barrel. In a multishaft supporting device, since heat is generated most at the inside portions of the recesses 16a, 16b or 18a, 18b it is advantageous to locate the inserts 13 in these recesses but the inserts 13 may be located at positions other than those illustrated in FIGS. 5 and 6.

Although the invention has been shown and described in terms of a twin shaft supporting apparatus, it will be clear that the invention is also applicable to devices for supporting three or more shafts.

As above described, the invention provides a multishaft supporting device having a high heat transfer efficiency and can be manufactured at a low cost.

We claim:

1. A multishaft supporting device comprising a barrel provided with a bore, a sleeve inserted into said bore and provided with an opening for receiving a plurality of shafts, and inserts interposed between said barrel and said sleeve, said inserts being made of material having larger thermal expansion coefficient than said barrel and said sleeve.

2. The multishaft supporting device according to claim 1 wherein said inserts are located in recesses on a peripheral surface of said sleeve.

3. The multishaft supporting device according to claim 2 wherein said sleeve has generally a letter 8 like cross-sectional configuration for receiving two parallel shafts, annd said recesses are formed between axes of said shafts.

4. The multishaft supporting device according to claim 2 or 3 wherein said recesses extend in parallel with an axis of said barrel bore.

5. The multishaft supporting device according to claim 1, wherein said inserts are selected from metal selected from the group consisting of copper, aluminum, brass and stainless steel.

* * * * *